United States Patent [19]
Fairbairn et al.

[11] 3,898,377
[45] Aug. 5, 1975

[54] VIDEO MIXER

[75] Inventors: Douglas G. Fairbairn, Cupertino; Allan L. Swain, Palo Alto, both of Calif.

[73] Assignee: Xerox Corporation, Stamford, Conn.

[22] Filed: Nov. 23, 1973

[21] Appl. No.: 418,506

[52] U.S. Cl. ................ 178/6; 178/6.8; 178/DIG. 1; 178/DIG. 6; 178/DIG. 22
[51] Int. Cl. ............................................ H04n 7/18
[58] Field of Search..... 178/DIG. 6, 5.8 R, DIG. 22, 178/DIG. 1, 6.8; 340/324 A D; 179/27; 307/241

[56] References Cited

UNITED STATES PATENTS 3,702,898 11/1972 Webb..................................... 178/6
3,812,286 5/1974 Tkacemko.......................... 178/6.8

*Primary Examiner*—Robert L. Griffin
*Assistant Examiner*—Edward L. Coles
*Attorney, Agent, or Firm*—James J. Ralabate; Terry J. Anderson; John H. Chapman

[57] ABSTRACT

A video mixer for providing video signals to be displayed on a monitor, which signals may be derived from a character generator and an external video source. The mixer can route character generator video or external video only to the monitor. The mixer may also on command mix these two signals to provide a combined output signal. The mixer has the further capability of deriving horizontal and vertical blanking signals from an incoming synchronization signal and providing them to the character generator for synchronization.

18 Claims, 4 Drawing Figures

SYNC PROCESSOR

PATENTED AUG 5 1975 3,898,377

SHEET 4

VIDEO MIXER

BACKGROUND OF THE INVENTION

This invention relates to a device for a video display system, and more particularly to a device for providing video signals to be displayed on a display medium.

A fundamental operation in display systems is the processing of data from its original form to video signals which are intended for display on a medium, such as a monitor. The input data may either be digital or analog, which may also include data entered into the system by means of an input device such as a light pen. Such a monitor may be a cathode ray tube display device which utilizes relatively low speed scanning in which the scanning beam is deflected or bent to form the symbols to be displayed in accordance with the video signals provided. Such signals may be generated from a character generator device, such as described in U.S. patent application Ser. No. 418,509 filed on Nov. 23, 1973 and assigned to the assignee of the present invention, output information from a digital computer, or in general from some external video source.

It is an object of the present invention to provide a display medium with video signals to be displayed, which signals may be derived from one or more video sources.

It is another object of the present invention to provide a video mixer for presenting video signals to a monitor, which signals may be derived from a character generator and an external video source.

It is still another object of the present invention to provide a video mixer for presenting video signals to a monitor, which signals are representations of both character generator video and external video.

It is yet another feature of the present invention to provide a video mixer which has the capability of deriving horizontal and vertical blanking signals from incoming synchronization signals to provide an input signal to a character generator for its synchronization.

Other objects of the invention will be evident from the description hereinafter presented.

SUMMARY OF THE INVENTION

The invention provides a device for processing video information from a character generator and at least one external video source for presentation on a display medium. The display medium may be cathode ray tube monitor which would display the character generator video or external video by sequentially scanning its display screen.

Another feature of the invention is that the video mixer includes a sync separator which differentiates a synchronization signal from an incoming external composite video signal. This sync signal is provided ot a character generator for its synchronization.

Another feature of the invention is the inclusion of video amplifier logic within the mixer for processing video high and low signals into three discrete voltage levels, corresponding to a white, grey, or black dot on the display medium.

Still another feature of the invention is the inclusion of mixer logic which allows the display of the character generator output, the external video source, or the mixing of the two signals in a 50/50 ratio. During the mix operation, each signal is displayed at ½ amplitude.

These and other features which are considered to be characteristic of this invention are as set forth with particularity in the appended claims. The invention itself, however, as well as additional objects and advantages thereof, will best be understood from the following description when considered in conjunction with the accompanying drawings.

DESCRIPTION OF THE PREFERRED EMBODIMENT

Figure 1:
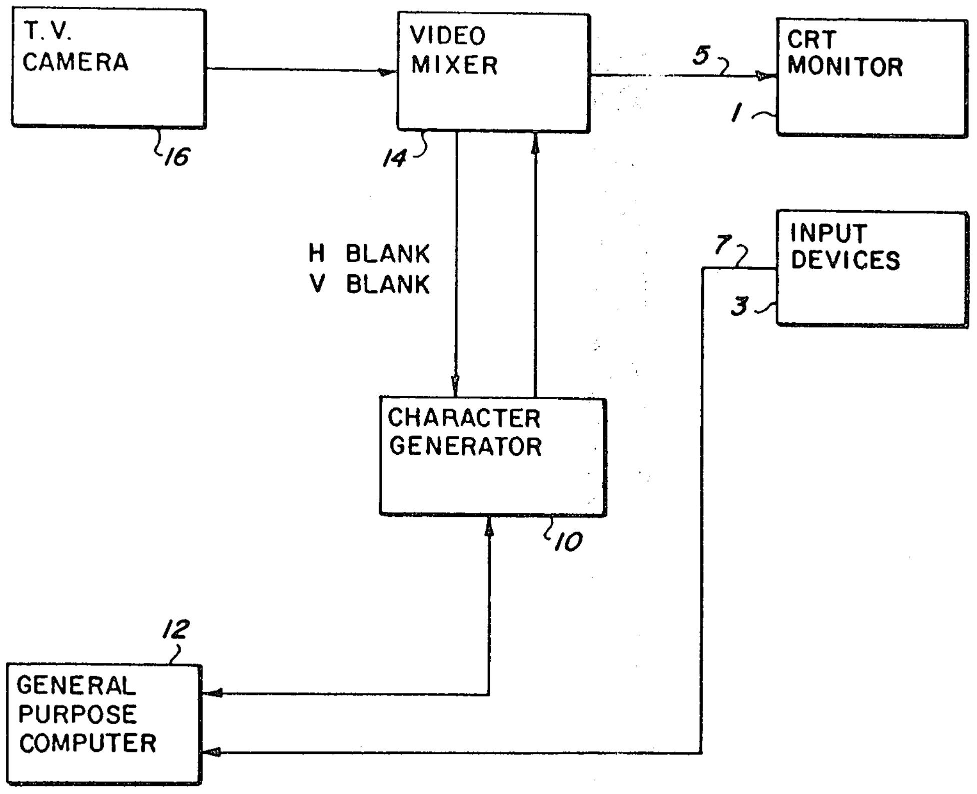
FIG. 1 is a functional block diagram illustrating the basic elements of the system of this invention.

In FIG. 1 is shown basic elements of a display system which converts binary information to a video signal which may be utilized on a display medium. Display media contemplated would include, but not be limited to, television receivers, cathode ray tube display terminals, and electrostatic and graphic printers. In this preferred embodiment, however, it will be assumed that one display medium is a cathode ray tube monitor 1. Any conventional T.V. type CRT terminal which sequentially scans the display screen would suffice. For optimum design, the terminal would use a 15-inch, 1029-line monitor oriented vertically in order to produce a video raster consisting of 1029-line horizontal video comprising a display area slightly larger than a standard sheet of 8-½ × 11 paper. The display may further be equipped with an independent keyboard, a keyset and an input device 3, such as a digital pointer, for positioning a cursor on the display area. A single coaxial cable 5 for the video signals and three twisted pairs 7 for digital data, i.e., input, output and clock, would connect the terminal to a central site where the character generator 10 and its associated computer 12 are located. If a plurality of terminals were contemplated, the connection would be radial in that each terminal would have its own set of connecting wires. The terminal could even include a collection facility through conventional logic design for accepting input data on the terminal and transmitting it to the controlling computer.

The input devices 3 are connected to the line 7 through the computer 12. A general purpose computer suitable for this embodiment is the Data General Nova 1200. The binary output of the computer 12 is connected to the input of the character generator 10 which then processes the binary information to generate output video signals. A video mixer 14 receives signals coming in from an external video source, such as a T.V. camera 16, processes the synchronizing information which is a part of these signals, and generates signals call horizontal (H) blank and vertical (V) blank which are transferred to the character generator 10 for synchronizing the video signals generated by the generator 10.

Instead of the T.V. camera 16, one could provide the necessary synchronizing signals from any commercially available synchronizing source. The T.V. camera 16 is also used to provide an external video signal which is processed through the mixer 14 to the monitor 1. Alternative sources of external video are tape recorders or other character generators. The video mixer 14 under control of the character generator 10 can select either the external video or video from the character generator 10. The video signals processed by the mixer 14 are transferred over the cable 5 to the CRT monitor 1 for viewing. The character generator 10 is fully described in U.S. patent application Ser. No. 418,509 filed on Nov.. 23, 1973 and assigned to the assignee of the present invention. As described therein, output signals from the character generator 10 are in the form of video high and low intensity signals which are fed to the video mixer 14 in the form of logic levels on two separate lines. In the mixer 14 these logic levels, e.g. 0 to 5 volts, are converted into T.V. video voltage levels, e.g. 0 to 1 volt, which are suitable as an input to the CRT monitor 1. The output from the external video source is selected by the video mixer 14 under control of an external select signal from the character generator 10.

Figure 2:
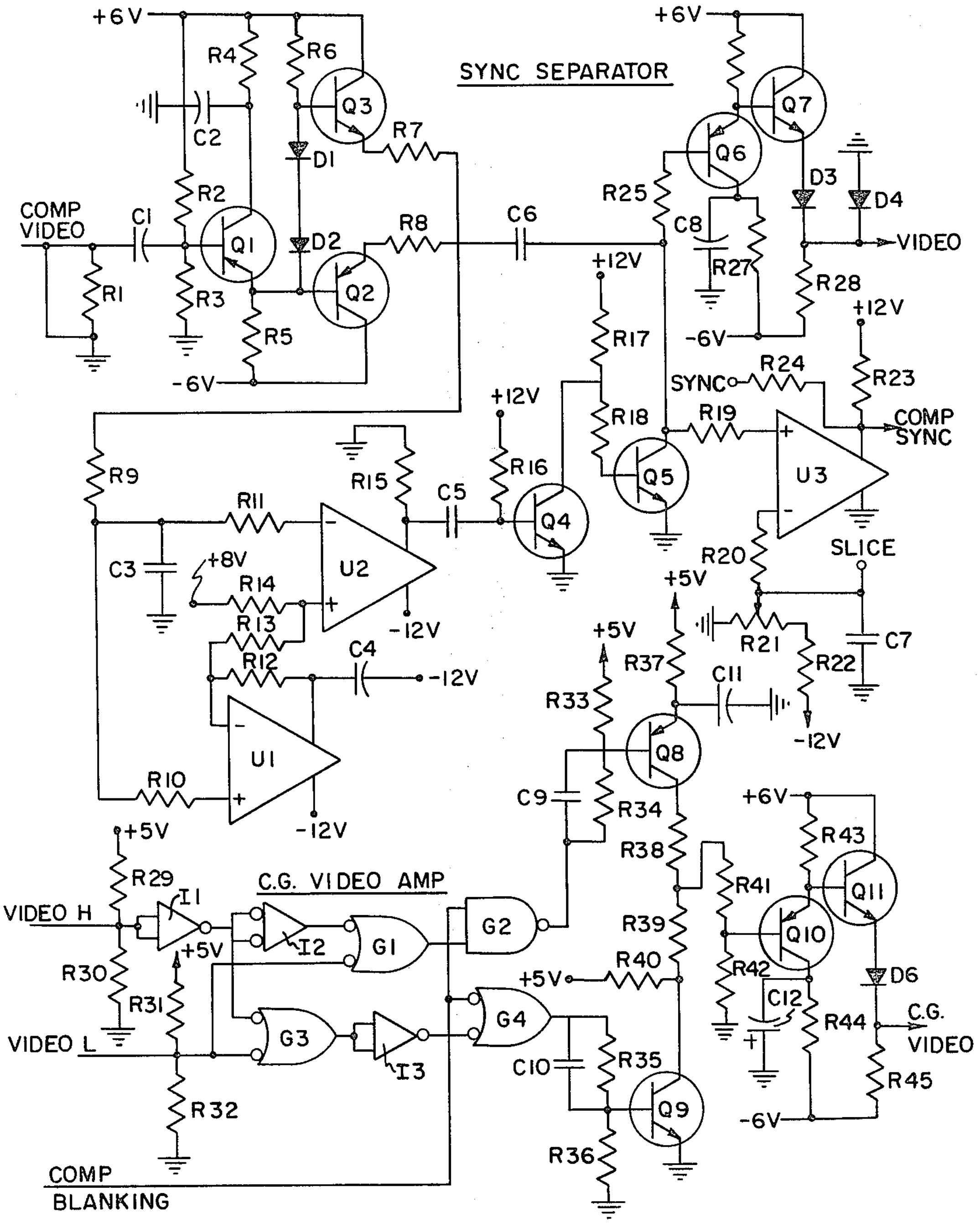
FIG. 2 is a schematic drawing of the sync separator and video amplifier portions of the video mixer shown in FIG. 1.

In FIG. 2 is shown the synchronization separator and the character generator video amplifier portions of the video mixer 14. A composite video input signal from the T.V. camera 16 or other suitable composite synchronization source is processed by the synchronization separator elements. The synchronization signals for the character generator 10 and the monitor 1 are derived from this composite video signal.

The composite video signal is applied to the junction of a resistor R1 and capacitor C1. This junction is connected to an isolation amplifier consisting of transistors Q1, Q2, and Q3 and their associated components R2-R8, C2, and D1 and D2 to provide a voltage gain of approximately 1. The amplifier element also provides a low impedance source for a back-porch clamp which consists of a transistor Q5.

Comparators U1 and U2 and transistors Q4 and Q5 provide a back-porch clamping circuit. The comparator U1 acts as a charge pump for the capacitor C4 to keep the voltage on the capacitor C4 near the most negative point of the amplified composite video input signal. The comparator U2 compares the video input with the voltage across the capacitor C4 and generates a positive-giving pulse on all sync pulses. This pulse is differentiated by a capacitor C5 and the negative-going spike resulting from the trailing edge turns off the transisor Q4 and turns on the transistor Q5. The transistor Q5 acts as a back-porch clamp in restoring the d-c level of the amplified composite video signal which has been coupled thorugh a capacitor C6.

The d-c restored video signal is applied to a comparator U3 through a resistor R19 and compared with the voltage level set by a resistor R20. Thereby, a composite sync signal is generated at the output of the comparator U3. Furthermore, the d-c restored composite video signal at the collector of the transistor Q5 is also applied to a buffer amplifier comprised of transistors Q6 and Q7 through a resistor R25. The output of the transistor Q7 is clamped by a diode D4 which removes the synchronization signal from the composite video signal such that a pure video signal VIDEO is generated.

The reference voltage which is compared by the comparator U3 to the clamped video signal is set by a potentiometer R21 which provides the level at which sync is detected. The terminal designated SYNC is an external test point which would allow one to ensure that the composite sync signal is generated. Utilization of this test point also allows the adjustment of a resistor R21 to an optimum point. The resistors R9–18, R22, R23, and R26–28 are provided for design consideration such as isolation and scaling. Capacitors C3, C5, C7, and C8 serve the design functions of isolation or filtering. Diode D3 biases the emitter output of the transistor Q7.

High (H) and low (L) video control signals are received by the character generator video amplifier portion also shown in FIG. 2. When a high intensity bit is to be displayed on the monitor 1, the bit appears on video H. When the low intensity bit is to be displayed, that bit appears on video L. These two logic level signals, video H and video L, are converted to three analog voltage levels. This is done by gating the video H signal through an inverter I1, and inverter I2, a NOR gate G1, a NAND gate G2 through the RC network consisting of a capacitor C9 and resistors R33 and R34 to control the operation of a transistor Q8. The video H signal is also gated through an NOR gate G3, inverted by an inverter I3, and gated through an NOR gate G4 through the network consisting of a capacitor C10 and resistors R35 and R36 to control the operation of a transistor Q9. The video L signal is gated through the NOR gate G1 and the NAND gate G2 to control the operation of the transistor Q8, while being gated through the NOR gate G3, inverter I3, and OR gate G4 to control the operation of the transistor Q9.

When the video H and video L signals are at a high logic level, the transistor Q8 is forced to the off state and the transistor Q9 is biased to the on state. The base of a transistor Q10 is connected through resistors R38, 39 and 41 to the collectors of the transistors Q8 and Q9. With the transistor Q8 off and the transistor Q9 on, the base of the transistor Q10 is thus forced to a ground potential. When video L goes to a low logic level, with video H remaining high, it forces the output of the NAND gate G2 low turning the transistor Q8 on. With the transistor Q9 remaining on, the voltage at the base of the transistor Q10 is shifted to approximately 0.6 volts. When the video H signal represents a low logic level, with video L being high, the output of the NOR gate G4 goes low turning off the transistor Q9. With the output of the NAND gate G2 going low turning on the transistor Q8, the voltage at the base of the transistor Q10 becomes approximately 1.1 volts. Thereby, the two logic signals video H and video L are converted into three discrete voltage levels, corresponding to a white, grey, or black dot which is to be represented on the display monitor 1.

The transistor Q10 and a transistor Q11 along with their associated resistors R43, R44, R45, and a capacitor C12 to comprise a buffer amplifier with a gain of 1 for the voltage input to the base of the transistor Q10. A diode D6 level shifts the amplified signal identified as C.G. video for application to the mixer portion of the video mixer 14 shown in FIG. 4.

A COMP BLANKING signal is introduced at the gates G2 and G4 to ensure that the character generator C.G. video will be blanked immediately at the end of a scan line. The COMP BLANKING signal is provided by the synchronization processor circuit shown in FIG. 3 which provides that the COMP BLANKING signals goes low at the end of a scan line, forcing the transistor Q8 off and Q9 on. This results in the base of the transistor Q10 going to ground, corresponding to a black display on the monitor 1. The additional resistors shown R29–R32, R37, R40 and R42 and a capacitor C11 are provided for scaling or isolation purposes.

Figure 3:
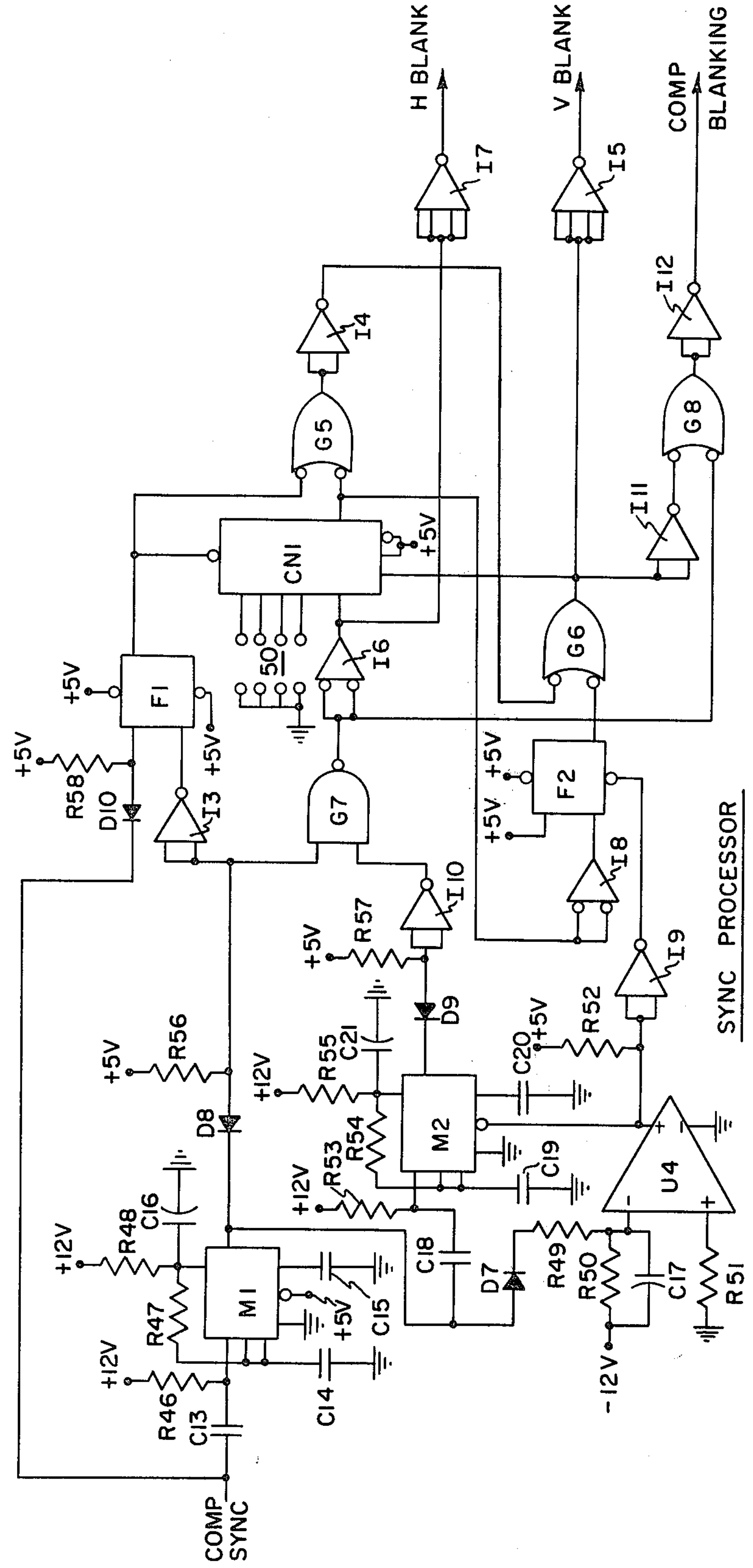
FIG. 3 is a schematic drawing of the sync processor portion of the video mixer as shown in FIG. 1.

The synchronization processor circuit shown in FIG. 3 performs several functions upon receiving the composite sync signal which was separated from the composite video signal as described in relation to FIG. 2. The signal COMP SYNC is applied to a monostable vibrator M1 through a coupling capacitor C13. The multi-vibrator M1 has a period slightly greater than the maximum expected width of the horizontal sync pulses. The multi-vibrator M1, and inverter I3, and a flip-flop F1 serve to separate the horizontal sync pulses from the vertical sync pulses, both of which comprise the COMP SYNC signal, in accordance with their relative width. Since the horizontal sync signal will have a much narrower width than that of the vertical sync signal, this is possible. The multi-vibrator M1 is fired on the leading edge of the COMP SYNC signal, and if the sync signal is still present when the multi-vibrator M1 returns to its stable state, then the sync signal or pulse is determined to be a vertical sync pulse as opposed to a horizontal sync pulse.

The pulse provided by the multi-vibrator M1 is inverted by the inverter I3 and applied to the clock input of the flip-flop F1. If the sync pulse is still present at the time M1 returns to a stable state, indicating that it is a vertical sync pulse, the output of the flip-flop F1 goes high and enables the parallel load function of a counter CN1. A binary value is loaded into the counter CN1 by means of jumpers in an integrated circuit socket 50. The counter CN1 will be loaded on the first occurrence of a horizontal sync pulse after the occurrence of a vertical sync pulse.

The vertical sync pulse is gated through the NOR gate G5, inverted by an inverter I4, gated through another NOR gate G6, and inverted by an inverter I5 to provide a new vertical blanking signal V BLANK which is to be applied to the character generator 10. A new horizontal blanking signal H BLANK is also to be applied to the character generator 10, having been developed from the horizontal sync pulse which was gated through the NAND gate G7 and inverters I6 and I7.

The width of V BLANK is determined by the value loaded into the counter CN1. In this way, V BLANK has a width equal to the width of the incoming vertical sync pulse plus some number N of horizontal lines. The number N is usually 31 except for 525 line video, in which case N is equal to 15. The value of the number N may be changed by changing the jumpers in the socket 50. Thus, the video mixer 14 is capable of operating at various line rates within the range of any commercially available video system, e.g. line rates between 525 lines per frame to 1229 lines per frame. by controlling the width of the signal V BLANK, one may change from a given line rate to another.

The width of V BLANK is specifically provided by the counter CN1 counting horizontal sync pulses applied through the gate G7 and the inverter I6. When the counter CN1 overflows to provide a signal through an inverter I8 to set a flip-flop F2, which acts as an additional bit for the counter CN1. When the counter CN1 again counts to a maximum, the output of the NOR gate G6 goes low and further counting is disabled. Thus, the signal V BLANK terminates and its width is determined for dealing with a given line rate. Of course, to provide for a different line rate a different value is loaded into the counter CN1 to adjust the width of the signal V BLANK accordingly.

When a 525 line video signal is applied to the processor circuit shown in FIG. 3, it is desirable to remove equalizing pulses which may be present in its vertical interval which are twice the horizontal frequency. A comparator U4 and a multi-vibrator M2 are connected within the circuit as shown for this purpose, and modify the signal V BLANK as described below. An integrating circuit comprised of a resistor R50 and a capacitor C17 would show a different average value across it at different line rates. This value becomes more negative than ground for line rates below 600 lines. Thus, the output of the comparator U4 goes positive. The output signal from the comparator U4 enables the multi-vibrator M2 and further forces the flip-flop F2 to the cleared state through an inverter I9. The multi-vibrator M2 will mask the double frequency equalizing pulses by providing a low signal level on an input to the NAND gate G7 through an inverter I10 during three-quarters of the horizontal line time. By forcing the flip-flop F2 to the cleared state, the number of horizontal lines during the signal V BLANK is reduced from 31 to 15.

The COMP BLANKING signal is derived from the H BLANK and V BLANK synchronization signals. The output of the NAND gate G7 is NOR'ed through a NOR gate G8 along with the output of the NOR gate G6 having been inverted by an inverter I11. The output of the NOR gate G8 is inverted through an inverter I12 to provide the COMP BLANKING signal. The adddi-tional resistors R46–R49, R51–R58, capacitors C14–C16, C18–C21, and diodes D7–D10 satisfy design considerations.

Figure 4:
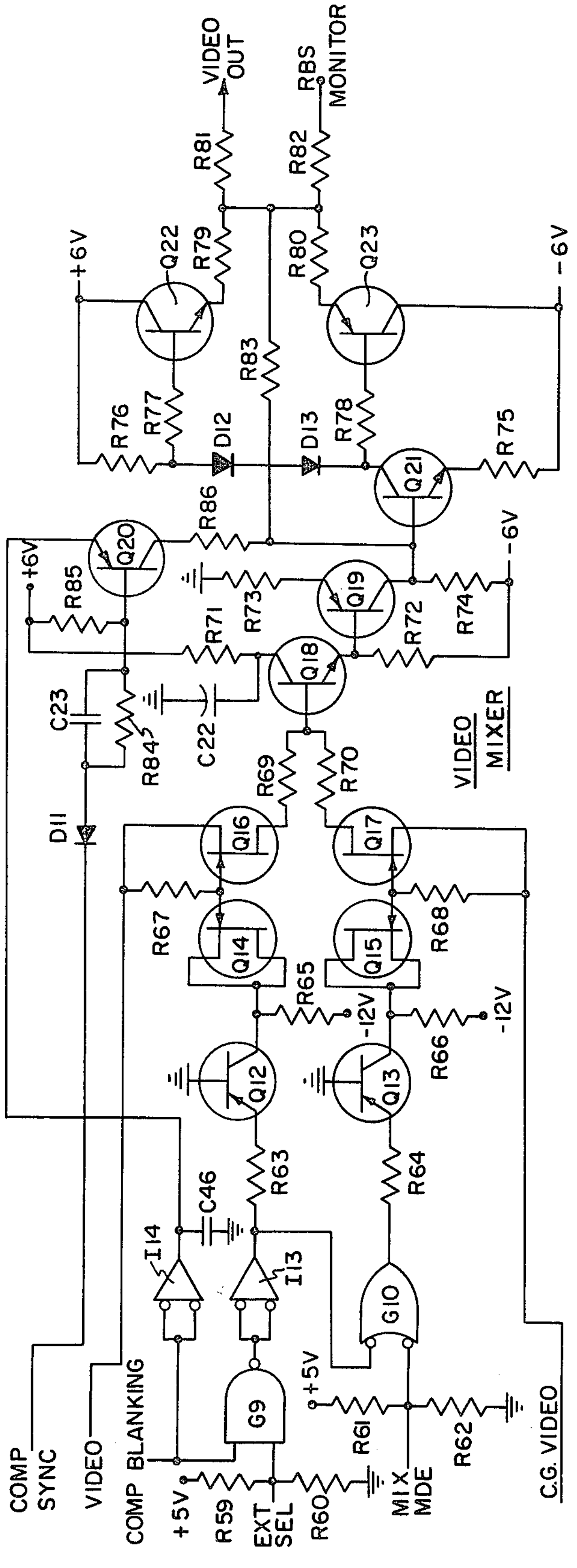
FIG. 4 is a schematic drawing of the mixer logic of the video mixer as shown in FIG. 1.

The video mixer circuit which constitutes the remaining portion of the video mixer 14 is shown in FIG. 4. This circuit performs the vital function of processing an external video signal VIDEO and the character generator video signal CG VIDEO which are identified in FIG. 2. These signals may be processed such that they are displayed separately on the monitor 1 or combined in a 50-50 ratio mix. The particular type of display which is generated is governed by two digital select signals, external select (EXT SEL) and mix-mode (MIX MDE), which are generated by the character generator 10. The signal COMP BLANKING is ANDed with the signal EXT SEL through a NAND gate G9 to ensure that the external video signal ends at the same instant at which the character generator video C.G. VIDEO ends. The output of the gate G9 is inverted by the inverter I13 and applied to the emitter of a transistor Q12 through a resistor R63.

When EXT SEL is present and COMP BLANKING is not present, then the output of the gate G9 is low making the output of the inverter I13 a high signal which turns on the transistor Q12. The transistor Q12 is connected through a field effect transistor Q14 to drive a field effect transistor Q16. The transistor Q14 is used as a diode to minimize switching transients. The transistor Q16 acts as an on-off switch which controls the application of external video signals VIDEO to a summing resistor R69. When the transistor Q16 is driven by the transistor Q12, VIDEO is connected directly to the resistor R69; when the transistor Q16 is off, it disconnects VIDEO from the resistor R69.

The signal MIX MDE is ORed with the output of the inverter I13 through a NOR gate G10 which is connected to the emitter of a transistor Q13 through a resistor R64. If either of the input signals to the gate G10 is low, the transistor Q13, which is connected through a field effect transistor Q15 to another field effect transistor Q17, is turned on to drive the transistor Q17. When the transistor Q17 is on, it applies the character generator video signal C.G. VIDEO to the resistor R70.

If the transistor Q17 is turned on and the transistor Q16 is not, the C.G. VIDEO signal alone is applied to the base of a transistor Q18. If only the transistor Q16 is turned on, the VIDEO signal alone is applied to the base of the transistor Q18. When both the transistor Q17 and the transistor Q16 are turned on, the C.G. VIDEO and VIDEO signals are combined in a particular way. When only one of the two signals is applied, that signal is applied to the amplifier transistor Q18 with full amplitude. If both the character generator video signal C.G. VIDEO and the external video signal VIDEO are applied simultaneously, the signal which is applied to the base of the transistor Q18 is the voltage sum of one-half of the signal from VIDEO and one-half of the signal from C.G. VIDEO. Thus, a particular instantaneous averaging of the VIDEO signal and the C.G. VIDEO signal is provided to ensure that this mixing of two high amplitude signals does not saturate the transistor Q18 and thus the display monitor 1.

The transistor Q18 in combination with transistors Q19, Q21, Q22, and Q23 along with associated resistors R84, capacitor C22, and diodes D12 and D13 comprise an output amplifier for the video mixer 14 with a nominal gain of 4. The transistor Q18 is connected as an emitter follower and thus acts as a buffer between the summing node at its base and the remaining portion of the amplifier. The transistors Q19 and Q21 are common emitter amplifiers. The output transistors Q22 and Q23 are emitter followers which ensure a low output impedance for driving a 75 ohm coaxial cable 5 between the mixer 14 and the monitor 1. The diodes D12 and D13 provide requisite voltage offset between the bases of the transistors Q22 and Q23.

Since a composite video signal is desired at the output VIDEO OUT of the circuit shown in FIG. 4, the signal COMP SYNC is added to the video signal being processed. The signal COMP SYNC is applied to the base of a transistor Q20 through a diode D11 and a differentiating circuit comprised of a resistor R84 and a capacitor C23. The transistor Q20 is driven by the signal COMP SYNC in its base, biased by a voltage of +6 volts through a resistor R85, and the signal COMP BLANKING on its emitter through an inverter I14. The capacitor C46 delays the COMP BLANKING signal from the inverter I14 to guarantee that COMP SYNC will not be inserted into the video signal being processed until after the video has been blanked. The output of the inverter I14 must be high and the base of the transistor Q20 low before the transistor Q20 turns on to add the synchronization signal COMP SYNC to the video through the resistor R86 which is connected between the collector of the transistor Q20 and the base of the transistor Q21.

The output amplifier stage has an output terminal labeled RBS monitor as shown in FIG. 4 which provides the same output signal as appears on the cable 5 to the monitor 1. The RBS monitor terminal may be used for diagnostic purposes. The mixing of the video signals at the base of the transistor Q18 and the use of the transistors Q16 and Q17 as high frequency, solid state switches allows one to attain the various mix modes with a fairly rapid turn-on and turn-off time. The turn-on and turn-off time is less than 150 nanoseconds which allows one to switch from a character generator video only to a video only or a mix mode, or a mixed type of signal, within less than a character time of a character generator. The resistors R59–R62 and R65–R68 are used for design considerations.

In this preferred embodiment, suitable values of the various circuit components are as follows:

| REFERENCE | DESCRIPTION |
|---|---|
| C1,2,8,12,16,21,22 | Capacitor 10μfd, 20v, Tant. |
| C3 | Capacitor 5pfd, DM15, 10% |
| C4 | Capacitor 1μfd, 20v, Tant. |
| C5 | Capacitor 100 pfd, CKO5 |
| C6,7 | Capacitor .1μfd, CKO5 |
| C9,23 | Capacitor 22pfd, Cer. |
| C13,18 | Capacitor 180pfd, CKO5 |
| C14 | Capacitor 680pfd, CKO5 |
| C15,20 | Capacitor .01μfd, CKO5 |
| C17 | Capacitor 100μfd, 20v, Tant. |
| C19 | Capacitor 3900pfd, CKO5 |
| C10 | Capacitor 47pfd, Cer. |
| C46 | Capacitor 390pfd |
| D1-13 | Diode, 1N4148 |

| REFERENCE | DESCRIPTION |
|---|---|
| R1,81,82 | Resistor, 75 ohm, ¼w, 5% |
| R2 | Resistor, 30K ohm |
| R3,9–11 | Resistor, 5.1K ohm |
| R4,12,27,44,71 | Resistor, 100 ohm |
| R5 | Resistor, 200 ohm |
| R6,25,30,32,60,62,69, 70,74,76 | Resistor, 390 ohm |
| R7,8,79,80 | Resistor, 5.1 ohm |
| R13,52,56–58,85 | Resistor, 2K ohm |
| R14 | Resistor, 150K ohm |
| R15 | Resistor, 1.8K ohm |
| R16,19,20,54,67,68 | Resistor, 10K ohm |
| R21 | Potentiometer,5K,No.3009P-1-502 |
| R22,46,53 | Resistor, 20K ohm, ¼w, 5% |
| R18,23,24,42,51,33, 63,64 | Resistor, 1K ohm |
| R17,26,49 | Resistor, 6.2K ohm |
| R28,40,45,72 | Resistor, 620 ohm, ¼w, 5% |
| R29,31,48,55,59,61 | Resistor, 180 ohm |
| R34 | Resistor, 2.4K ohm |
| R35 | Resistor, 820 ohm |
| R36 | Resistor, 470 ohm |
| R37 | Resistor, 10 ohm |
| R38,39 | Resistor, 82 ohm |
| R41,43 | Resistor, 3K ohm |
| R47 | Resistor, 7.5K ohm |
| R50 | Resistor, 51K ohm |
| R65,66 | Resistor, 24K ohm |
| R73,75 | Resistor, 160 ohm |
| R86 | Resistor, 1.6K ohm |
| R77,78, | Resistor, 47 ohm |
| R83 | Resistor, 5.76K, ¼w, 1% |
| R84 | Resistor, 510 ohm, ¼w, 5% |
| Q1,3,7,9,11,18,21,22 | Transistor, 2N3563, NPN |
| Q2,6,8,10,19,23 | Transistor, 2N4258, PNP |
| Q4 | Transistor, 2N3904, NPN |
| Q5 | Transistor, 2N5129, NPN |
| Q12,13,20 | Transistor, 2N3906, PNP |
| Q14,15,16,17 | Transistor, 2N5654, FET |

Obviously, many modifications of the present invention are possible in light of the above teaching. It is therefore to be understood that, in the scope of the appended claims, the invention may be practiced other than as specifically described.

What is claimed is:

1. A video mixer for providing video signals to be displayed on a monitor comprising:

gating means for processing control signals;

at least two high speed switching means responsive to the output of said gating means for respectively applying video signals upon a given command by said control signals; and combining means including at least two load means connected in parallel with one another at a summing node, each of which is connected to a corresponding switching means, for mixing said video signals in a 50-50 ratio.

2. The video mixer as defined in claim 1 wherein the signal at said summing node when each of said video signals are simultaneously applied is the combinatorial sum of these signals at one-half of their amplitude at each instant of time.

3. The video mixer as defined in claim 2 in which said combining means includes an amplifier means for amplifying the signal generated at said node to a usable output intensity, said amplifier means comprising an amplifier transistor means, the base of which is connected to said node.

4. The video mixer as defined in claim 3 in which another of said video signals is developed from an external video signal which includes a synchronization signal and wherein is further included means for separating the synchronization signal from the video signal and means responsive to said synchronization signal for providing synchronized character information to said monitor.

5. The video mixer as defined in claim 4 wherein is further included means for combining said synchronization signal with the video signal generated at said summing node, whereby the combined signal is displayed on the monitor.

6. The video mixer as defined in claim 4 in which said high speed switching means are field effect transistors which are connected to said gating means through respective transistor means for driving said field effect transistors.

7. The video mixer as defined in claim 5 in which said combining means includes an amplifier means for amplifying the signal generated at said node to a usable output intensity, said amplifier means comprising an amplifier transistor means, the base of which is connected to said node.

8. The video mixer as defined in claim 1 in which said high speed switching means are field effect transistors which are connected to said gating means through respective transistor means for driving said field effect transistors.

9. The video mixer as defined in claim 1 in which one of said video signals has three discrete voltage levels developed from a video input signal having high and low intensity levels and wherein is further included logic means for developing said three level signal from said two level signal and is further included means responsive to said three level signal for displaying the respective three states of information represented by said signal on said monitor.

10. A video mixer for providing video signals to be displayed on a monitor comprising:

gating means for processing control signals;

at least two high speed switching means responsive to the output of said gating means for respectively applying video signals upon a given command by said control signals;

one of said video signals has three discrete voltage levels and the other is an external video signal;

logic means for developing said three level video signal from a video input signal having high and low intensity levels;

at least two load means connected in parallel with one another at a summing node, each of which is connected to a corresponding switching means, for mixing said video signals in a 50-50 ratio; and means responsive to said video signals for displaying the information represented by said signals on said monitor.

11. The video mixer as defined in claim 10 wherein the signal at said summing node when each of said video signals are applied is the sum of these signals at one-half of their amplitude.

12. The video mixer as defined in claim 10 wherein is further included means for combining said synchronization signal with the video signal generated at said summing node, whereby the combined signal is displayed on the monitor.

13. The video mixer as defined in claim 12 in which said high speed switching means are field effect transistors which are connected to said gating means through respective transistor means for driving said field effect transistors.

14. The video mixer as defined in claim 12 in which said combining means includes an amplifier means for amplifying the signal generated at said node to a usable output level, said amplifier means comprising means comprising an amplifier transistor means, the base of which is connected to said node.

15. The video mixer as defined in claim 10 wherein said external video signal includes a synchronization signal and wherein is further included means for separating the synchronization signal from said external video signal whereby an external video signal without synchronization is provided.

16. The video mixer as defined in claim 15 wherein is further included means for combining said synchronization signal with the video signal generated at said summing node, whereby the combined signal is displayed on the monitor.

17. The video mixer as defined in claim 16 in which said high speed switching means are field effect transistors which are connected to said gating means through respective transistor means for driving said field effect transistors.

18. The video mixer as defined in claim 16 in which said combining means includes an amplifier means for amplifying the signal generated at said node to a usable output level, said amplifier means comprising means comprising an amplifier transistor means, the base of which is connected to said node.

* * * * *